United States Patent [19]

Park et al.

[11] Patent Number: 5,712,211
[45] Date of Patent: Jan. 27, 1998

[54] ELECTRICAL DISCHARGE MACHINABLE MG-PSZ/TIB2 CERAMIC COMPOSITE

[75] Inventors: Dong-Soo Park; Hai-Doo Kim, both of Sangnam-dong, Rep. of Korea

[73] Assignee: Korea Institute of Machinery & Materials, Rep. of Korea

[21] Appl. No.: 647,320

[22] Filed: May 9, 1996

[51] Int. Cl.$^6$ .......................... C04B 35/58; C04B 35/488
[52] U.S. Cl. ........................... 501/96; 501/104; 252/520
[58] Field of Search ..................... 501/96, 103, 104; 252/520

[56] References Cited

U.S. PATENT DOCUMENTS

| | | | |
|---|---|---|---|
| 4,748,138 | 5/1988 | Watanabe et al. | 501/104 |
| 4,808,372 | 2/1989 | Koczak et al. | 420/457 |
| 5,143,869 | 9/1992 | Watanabe et al. | 501/103 |
| 5,180,696 | 1/1993 | Inoue | 501/103 |

OTHER PUBLICATIONS

T. Watanabe et al., "Mechanical Properties of Hot-Pressed TiB$_2$-ZrO$_2$ Composites", 68 *Journal of the American Ceramic Society* C-34 (1985) No Month.

S. Torizuka et al., "Effects of ZrO$_2$ Addition on the Mechanical Properties of TiB$_2$ HIP'ed Compacts", 100 *Journal of the Ceramic Society of Japan* 259-265 (1992) No Month.

C.S. Montross, "Relationships of Tetragonal Precipitate Statistics with Bulk Properties in Magnesia-Partially Stabilized Zirconia", 11 *Journal of the European Ceramic Society* 471-480 (1993) No Month.

J. Matsushita et al. "Sinterability and Fracture Toughness of TiB$_2$-ZrO$_2$ Composites by Pressureless Sintering", 37 *Journal of Powder and Powder Metallurgy* 69-73 (1990) No Month.

S. Khatri et al. "Formation of TiC in in situ processed composites via solid-gas, solid-liquid and liquid-gas reaction in molten Al-Ti", A162 *Materials Science and Engineering* 153-162 (1993) No Month.

D. Hu et al., "Coarsening of TiC particles in a rapidly solidified Ti6A14V-TiC composite", 209 *Journal of Alloys and Compounds* 167-173 (1994) No Month.

*Primary Examiner*—Karl Group
*Attorney, Agent, or Firm*—Adduci, Mastriani & Schaumberg, L.L.P.

[57] ABSTRACT

An electrical discharge machinable MgO-Partially Stabilized Zirconia (PSZ) and titanium di-boride (TiB$_2$) ceramic composite body of good mechanical properties and the method of making it are disclosed. The ceramic composite comprising less than 40% by weight of TiB$_2$ balanced by 10 mole % of MgO-Partially Stabilized Zirconia is fully densified by pressureless sintering at 1850° C.–1900° C. and exhibits the fracture toughness (K$_{IC}$) value of 8–11 MPa·m$^{1/2}$ measured according to the indentation crack length method and Evans-Charles' method provided in Journal of the American Ceramic Society volume 59 [7–8], 371–372 (1976) after annealing at 1320°–1400° C.

3 Claims, 1 Drawing Sheet

ELECTRICAL DISCHARGE MACHINABLE MG-PSZ/TIB2 CERAMIC COMPOSITE

BACKGROUND OF THE INVENTION

1. Field of the Invention

The present invention relates to electrically conductive pressureless sintered (Mg-PSZ)/$TiB_2$ composite of good mechanical properties and to a method of making it.

2. Description of the Prior Art

Advanced ceramics have been attracted a lot of attention for the candidate materials of certain parts for the advanced machinery due to their excellent mechanical and/or chemical properties. Thanks to the intensive R&D activities, there are many advanced ceramics parts serving for the advanced and more efficient machinery today.

However, there are two major barriers to more widespread use of the advanced ceramics. The first barrier is the brittleness of the ceramics. Compared with the metallic materials, the fracture toughness (resistance to the crack propagation, i.e. resistance to the brittle and catastrophic fracture) is only 1/40–1/20 that of the metals. So, the ceramics, inspite of their excellent hardness, chemical inertness, heat resistance, lightness and other good properties, require very careful handling and practice to avoid the breakage. Among the advanced ceramics, partially stabilized zirconia(PSZ) is known to have higher fracture toughness than other ceramics. They, if properly heat-treated, exhibit the fracture toughness close to that of a cemented carbide. High fracture toughness of the PSZ results from the phase transformation from tetragonal to monoclinic crystal structure. The phase transformation accompanies volume expansion which applies the compressive stress around the region. The tetragonal phase region is retained at room temperature by a certain mechanical restraint, and the crack tip comes near the region to remove the restraint. The phase transformation at the crack tip applies the compressive stress which arrests the crack propagation. So it is necessary to have the retained tetragonal phase which is ready to transform to monoclinic phase at the temperature of interest upon being hit by a crack. Usually, retaining the tetragonal phase requires that the size of the tetragonal phase region be kept smaller than a critical one. Zirconia has been known to be stabilized by CaO, $CeO_2$, $Y_2O_3$, MgO and others. MgO-partially stabilized zirconia, hereinbelow is called as Mg-PSZ, has been extensively studied due to its good high temperature mechanical properties. Mg-PSZ exhibits varying mechanical properties depending on the heat treatment for controlling the size and amount of the tetragonal precipitates in the cubic matrix. If properly treated, Mg-PSZ shows the fracture toughness value more than 13 $MPa \cdot m^{1/2}$ which is well compared to that of the cemented carbide. It has good wear resistance and chemical stability at room temperature and at high temperature.

The second barrier to the widespread use of the advanced ceramics is the unbearable cost of the ceramic parts. Today, almost everywhere in the industrial field, they cut the price of the parts. If the price can not meet the requirements, the part often can not be actually employed. Major portion of the price of a ceramic part consists of machining cost. Up to now, usually the ceramics have been machined by diamond grinding tools. Since they are very hard and brittle, the ceramics are ground very slow and carefully. Therefore, machining of the ceramic is often very expensive. When the part has very complicated shape, it is even impossible to be machined by diamond grinding. Electrical discharge machining developed for machining metallic materials can be applied for the advanced ceramics to machine a complex shaped part if the ceramic is electroconductive enough. Most of the advanced ceramics are electrical insulators except several eletroconductive compounds like $TiB_2$, $ZrB_2$, TiC, WC and others. Zirconia is also an electrical insulator, but it can conduct the electricity if it is mixed with an electrical conductor like $TiB_2$ which provides the path for electrons. So, zirconia/$TiB_2$ ceramic composites have been studied by a few investigators.

T. Watanabe et al. reported on the hot pressed $TiB_2$-$ZrO_2$ composites in Journal of the American Ceramic Society, 68, C-34-c-36, (1985). $ZrO_2$ powder which they employed consisted of monoclinic phase. They could have 60% by weight of $TiB_2$—40% by weight of $ZrO_2$ composite fully densified which exhibits the flexural strength of about 800 MPa, the microhardness of 18 GPa, and the fracture toughness of about 7 $MPa \cdot m^{1/2}$. They could improve the fracture toughness of the composite close to 8.5 $MPa \cdot m^{1/2}$ at the expense of both flexural strength and hardness by slight increase of $ZrO_2$ content. Even though they could have the fully dense electroconductive $TiB_2$—$ZrO_2$ based composites, T. Watanabe et al. employed hot pressing technique for the fabrication. Hot pressing is very good way for densification, but it has a serious drawback in terms of the productivity. It can make only a very limited number of products of very simple shape. If the part has a complicated shape, machining cost becomes more expensive. One more thing that needs to be counted is that mechanical properties of the zirconia can be improved by taking advantage of the phase transformation. In order to make use of the phase transformation, zirconia should be at least partially stabilized at the temperature of use.

J. Matsushita et al. reported on the $TiB_2$—$ZrO_2$ composites fabricated by pressureless sintering in Journanl of Powder and Powder Metallurgy, 37, 69–73, (1990). They used 3Y-TZP (tetragonal zirconia polycrystal) of 0.3 micrometer size for the zirconia of the composite. Its density increased with the sintering temperature between 1600° C. and 1900° C. and with the zirconia (3Y-TZP) content. They could densify the composite up to 95% TD (theoretical density). However, they noticed that the sintered composite had cracks when it contained more than 50% by weight of zirconia and sintered at the temperature higher than 1800° C. The composite containing 50% by weight of the zirconia sintered at 1700° C. exhibited microhardness value of 15 GPa and fracture toughness of 8.5 $MPa \cdot m^{1/2}$.

Mg-PSZ exhibits quite different sintering behavior from Y-TZP. Usually, it is sintered in cubic phase region. Mg-PSZ used for this invention is usually sintered at 1650° C. or above. It can be sintered at the temperature higher than that for Y-TZP without any problem like the cracks observed for Y-TZP specimens. The fact that higher temperature is available for sintering makes Mg-PSZ better candidate for the composite material with $TiB_2$ because the composites require higher fabrication temperature. There have been a lot of research and development activities on Mg-PSZ. It is widely recognized that the material exhibits very impressive mechanical properties if it is properly heat treated. It exhibits $K_{IC}$ value higher than 12 $MPa \cdot m^{1/2}$. Also, Mg-PSZ is Known to have good high temperature mechanical properties compared with Y-TZP.

SUMMARY OF THE INVENTION

It is, therefore, an object of the present invention is to provide an electrically conductive sintered ceramic composite material which can be electrical discharge machined efficiently enough, and to provide a method of making it.

The electrical discharge machinable ceramic composite material of the present invention comprises (a) Mg-PSZ which contains 10 mole % of MgO and (b) electroconductive ceramic compounds as the main constituents thereof, the sintered product has enough electrical conductivity to be electrical discharge machinable. Examples of such a component (b) include titanium di-boride ($TiB_2$) with electrical resistivity $9 \times 10^{-8}$ ohm cm, zirconium di-boride ($ZrB_2$) with electrical resistivity $10 \times 10^{-8}$ ohm cm, tungsten carbide (WC) with electrical resistivity $19 \times 10^{-8}$ ohm cm, titanium carbide (TiC) with electrical resistivity $61 \times 10^{-8}$ ohm cm, and etc.. Electrical discharge machining requires the material to have the electrical resistivity lower than 100 ohm cm for efficient machining. However, the lower the resistivity of the material, the more efficient the electrical discharge machining. Titanium di-boride is selected due to its lowest electrical resistivity among the ceramics. A sintered product with the desired electrical characteristics and mechanical properties can be obtained by using the other electroconductive compounds or mixtures of them instead of $TiB_2$. But, $TiB_2$ gives the lowest electrical resistivity to the composite if it contains the same content of electroconductive constituents. For the same electrical resistivity, the composite should contain more of the electrically conductive ingredients, which often causes trouble in densification of the composite. Lower sintered density leads not only to the poor mechanical properties but also to the low electrical conductivity because the pore disconnects the electricity.

Powder (a), Mg-PSZ, can be a solid solution of 8–10 mole % of MgO dissolved in $ZrO_2$, more preferably 10 mole % of MgO dissolved in $ZrO_2$. Particle size of powder (a) is preferred to be finer than 5 micrometer and $d_{50}$ to be as small as 1 micrometer. Total impurity of powder is preferably less than 500 ppm except $HfO_2$ which always coexists with $ZrO_2$. Powder (b), titanium di-boride, is preferred to have the average particle size (FSSS) of 1.7 micrometer of finer. Total impurity of powder (b) is preferred to less than 5% by weight, more preferably less than 3% by weight. If the particle size of the starting powders is too big, there is difficulty in densifying the composite. If the particle size of powder (b) is too big (>10 micrometer) or an appreciable amount of the powder (b) put in the mixture with powder (a) is as big as 10 micrometer, the sintered composite product can crack spontaneously due to the strong anisotropy of the particle (b). Even if the particle size of starting powder (b) is smaller than 10 micrometer, powder (b) is known to exhibit a very rapid grain growth during sintering at temperature above 1800° C.

According to the present invention, the electroconductive sintered ceramic composites should contain between 30 and 40% by weight of powder (b) and between 60 and 70% by weight of powder (a), more preferably, 35% by weight of (b) and 65% by weight of (a). If the sintered composite product contains less than 30% by weight of (b), it has too high electrical resistivity for efficient electrical discharge machining. If it contains more than 40% by weight of powder (b), there is difficulty in densifying the product by pressureless sintering technique. Sintering of the preferred composition is performed at the temperature between 1800° C. and 1950° C., more preferably between 1850° C. and 1900° C. in an inert atmosphere, preferably in flowing Argon, for 3 hours. If the sintering temperature is lower than 1800° C., the sintered product cracks spontaneously due to the tetragonal phase grains big enough for phase transformation to monoclinic phase and cracking upon cooling. If the sintering temperature is too high, i.e. higher than 1950° C., pore growth takes place and the sintered density drops. The sintered composite product of the preferred composition should have the electrical resistivity as low as 0.001 ohm cm and relative density of higher than 95%. Mechanical properties of the sintered composite of the preferred composition varied according to the annealing heat treatment for precipitating the tetragonal phase in the cubic phase matrix grains. Annealing consists of keeping the sintered composite product at the temperature between 1100° C. and 1450° C., more preferably at 1320°–1400° C. The holding time is up to 5 hours, more preferably between 0.5 hour and 2.5 hours. If annealing temperature is too low, i.e. lower than 1100° C., the holding time should be very long for precipitating the tetragonal phase. If it is too high, it is very difficult to control the size of the precipitates. If the holding time at 1320°–1400° C. is longer than 5 hours, the size of the precipitate is too big to remain in tetragonal phase upon cooling. If it is shorter than 0.5 hour, the precipitate does not develop well enough. Annealing is very important in determining the mechanical properties of the composite product.

DETAILED DESCRIPTION OF THE PREFERRED EMBODIMENT

Figure 1:
FIG. 1 is picture of the electrical discharge machined hole (about 0.35 mm dia.) on the sintered composite specimen of 35% by weight of $TiB_2$—65% by weight of Mg-PSZ which is 5 mm thick.

The following examples are provided to illustrate the electroconductive Mg-PSZ/$TiB_2$ composite and the method of making it. These examples do not limit the scope of this invention. Mg-PSZ hereinbelow represents 10 mole % of MgO-Partially Stabilized Zirconia.

EXAMPLE 1

35% by weight of $TiB_2$ (titanium di-boride, H.C. Stark Co., Grade A) and 65% by weight of Mg-PSZ (Unitec Ceramics Ltd., PSZ-M3.5) are weighed. The powders are put in the Acetal plastic jar containing the zirconia balls (3 mm dia.). Acetone is also poured in the jar. The mixture of the powders are ball milled for 72 hours. After ball milling, the powders are dried and pressed under 10 MPa to have the dimension of 36 mm dia.×6.5 mm thickness. After pressing, the formed compacts are cold isostatic pressed under 250 MPa. Pressureless sintering is performed at 1875° C. for 3 hours in flowing Argon atmosphere with the CIP'ed green body. After holding for 3 hours at the sintering temperature, the cooling rate was controlled at 10° C./min down to 600° C. The sintered specimen is further heat treated by annealing at 1320° C. for 0.5 hour.

The fracture strength of the above-indicated Mg-PSZ/$TiB_2$ composite is measured by 3-point bend test to be 560 +90 MPa. Microvickers hardness value under 1 Kg load is 1120 +67 $Kg/mm^2$, and $K_{IC}$, obtained according to Evans-Charles' method is $10.5 \pm 0.86$ MPa·$m^{1/2}$ after the indentation under 30 kg load. Density of the specimen is 5.10 g/cc which is slightly increased from 5.03 g/cc before the annealing. Electrical resistivity is measured by four point probe method to be 0.001 ohm cm. The result of the electrical discharge machining is shown in FIG. 1. The specimen shown in the FIG. 1 is electrical discharge machined faster than a cemented carbide.

EXAMPLE 2

A sintered Mg-PSZ/$TiB_2$ composite product is prepared according to the method described in the previous example except the annealing heat treatment. The sintered composite product is annealed at 1320° C. for 2.5 hours.

The fracture strength of the above-identified Mg-PSZ/TiB$_2$ composite is 714±81 MPa by 3-point bend test, Microvickers hardness under 1 Kg load is 914±51 Kg/mm$^2$ and K$_{IC}$ is 8.37±0.56 MPa·m$^{1/2}$. Density is 5.02 g/cc after annealing. Electrical resistivity is 0.017 ohm cm.

EXAMPLE 3

A Mg-PSZ/TiB$_2$ composite is sintered according to the method described in the previous examples. The annealing treatment of the sintered composite is performed at 1320° C. for 5 hours.

The fracture strength of the above-identified Mg-PSZ/TiB$_2$ composite is 650±24 MPa. Microvickers hardness is 791±60 Kg/mm$^2$ and K$_{IC}$ is 8.04±0.43 MPa·m$^{1/2}$. Density is 4.95 g/cc after annealing. Electrical resistivity is 0.02.5 ohm cm.

EXAMPLE 4

A sintered Mg-PSZ/TiB$_2$ composite product is prepared according to the method described in the previous examples except the annealing treatment. The sintered product is not annealed at all.

The fracture strength measured by 3-point bend test is 475±73 MPa. Microvickers hardness is 1200±92 Kg/mm$^2$ and K$_{IC}$ is 6.78±0.53 MPa·m$^{1/2}$. Density is 5.03 g/cc and electrical resistivity is 0.018 ohm cm.

EXAMPLE 5

A sintered Mg-PSZ/TiB$_2$ composite product is prepared according to the method described in the previous example except the annealing heat treatment. The sintered composite product is annealed at 1400° C. for 0.5 hour.

The fracture strength of the above-identified Mg-PSZ/TiB$_2$ composite is 634±60 MPa by 3-point bend test, Microvickers hardness under 1 Kg load is 1033±68 Kg/mm$^2$ and K$_{IC}$ is 10.5±0.58 MPa·m$^{1/2}$. Density is 5.03 g/cc after annealing. Electrical resistivity is 0.017 ohm cm.

EXAMPLE 6

A sintered Mg-PSZ/TiB$_2$ composite product is prepared by mixing 30% by weight of TiB$_2$ and 70% by weight of Mg-PSZ. The green compact prepared by the same method as described in the previous examples is sintered at 1850° C. for 3 hours in flowing Ar atmosphere. After sintered, the product is annealed at 1100° C. for 10 hours.

The fracture strength measured by 3-point bend test is 520±50 MPa. Microvickers hardness is 1260±80 Kg/mm$^2$ and K$_{IC}$ is 6.1±0.5 MPa·m$^{1/2}$. Density is 5.15 g/cc and electrical resistivity is 0.07 ohm cm.

Comparative Examples

The following table 1 shows the comparative examples performed with Mg-PSZ and TiB$_2$.

TABLE 1

| TiB$_2$ (wt %) | Mg-PSZ (wt %) | Sint. Temp.(°C.) | Density (g/cc) | Others |
|---|---|---|---|---|
| 15 | 85 | 1850 | 5.14 | resistivity: too high |
| 20 | 80 | 1850 | 5.05 | resistivity: 133 ohm cm |
| 25 | 75 | 1850 | 5 | resistivity: 0.35 ohm cm |
| 25 | 75 | 1750 | 5.07 | cracked |
| 30 | 70 | 1750 | 5.03 | cracked |
| 30 | 70 | 1950 | 4.83 | |
| 35 | 65 | 1750 | 5.06 | cracked |
| 35 | 65 | 1950 | 4.81 | |
| 40 | 60 | 1875 | 4.07 | |

The above table 1 shows that (a) there is a lower limit for the TiB$_2$ content for the electrical discharge machining, (b) there is a upper limit for the TiB$_2$ content for densification, (c) there is a lower limit for the sintering temperature (>1800° C.) in order to avoid cracking, and (d) there is a upper limit for the sintering temperature (<1950° C.) for densification.

The following table 2 shows the comparative examples performed with Mg-PSZ, monoclinic ZrO$_2$, or Y-TZP for ZrO$_2$ in order to fabricate the electroconductive composite. Sintering is performed at 1875° C. for 3 hours in flowing Ar atmosphere and annealing is at 1320° C. for 0.5 hour in the same atmosphere.

TABLE 2

| ZrO$_2$ | TiB$_2$ | Density (g/cc) | Strength (MPa) | Others |
|---|---|---|---|---|
| Mg-PSZ 65 wt % | 35 wt % | 5.10 | 560 ± 90 | annealed |
| Monoclinic ZrO$_2$ 65 wt % | 35 wt % | 4.69 | 235 ± 12 | |
| Y-TZP 65 wt % | 35 wt % | — | — | cracked |

The above table 2 shows that monoclinic ZrO$_2$ or Y-TZP is not proper for fabricating the electrical discharge machinable ceramic composite with TiB$_2$ by pressureless sintering technique which requires high sintering temperature.

What is claimed is:

1. An electroconductive ceramic composite having density higher than 4.95 g/cc and fracture toughness vlaue of 8–11 MPa·m$^{1/2}$ according to Evans-Charles' technique and consisting essentially of 30–40% by weight of TiB$_2$ and 60–70% by weight of Mg-PSZ.

2. The composite of claim 1 wherein the electrical resistivity is lower than 0.1 ohm cm.

3. The composite of claim 1 wherein the composite is fabricated by pressureless sintering in flowing argon atmosphere at 1850° C.–1900° C. and annealed at 1320°–1400° C. for less than 5 hours.

* * * * *

UNITED STATES PATENT AND TRADEMARK OFFICE
CERTIFICATE OF CORRECTION

PATENT NO. : 5,712,211
DATED : January 27, 1998
INVENTOR(S) : Dong-Soo PARK et al.

It is certified that error appears in the above-indentified patent and that said Letters Patent is hereby corrected as shown below:

Column 4, lines 53-54, change "560 + 90 MPa" to --560 ± 90 MPa--; and
line 55, change "1120 + 56 Kg/mm$^2$" to --1120 ± 67 kg/mm$^2$--.

Column 5, line 18, change "0.02.5 ohm" to --0.025 ohm--.

Signed and Sealed this

Twenty-sixth Day of May, 1998

Attest:

BRUCE LEHMAN

Attesting Officer

Commissioner of Patents and Trademarks